Patented Mar. 29, 1949

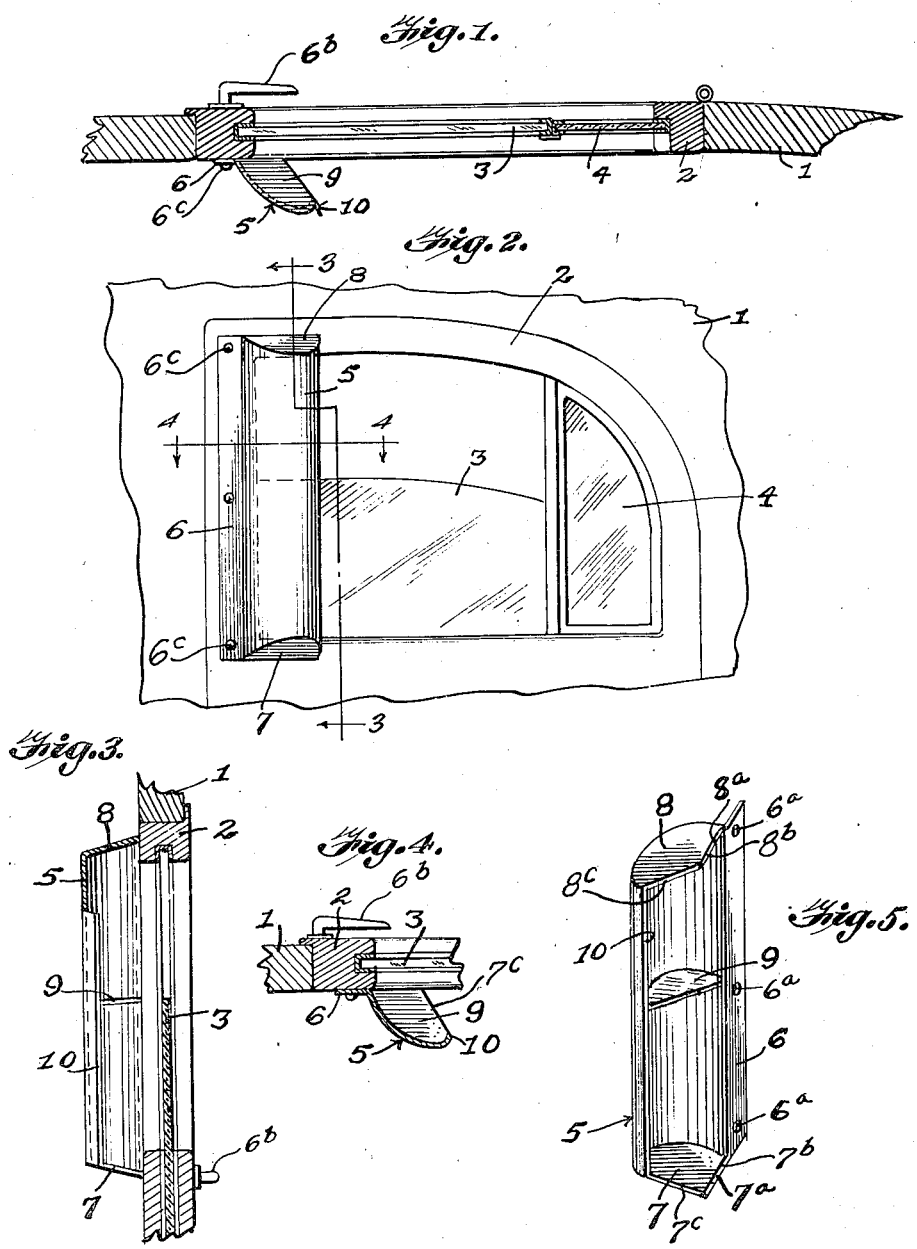

2,465,345

UNITED STATES PATENT OFFICE 2,465,345

ANTIDRAFT DEVICE

Otto Elsebusch, Los Angeles, Calif.

Application February 21, 1945, Serial No. 579,013

2 Claims. (Cl. 98—2)

This invention relates to an anti-draft device.

An object of the invention is the construction of a simple and efficient wind deflector to prevent drafts in an automobile and wind blowing onto the occupants of the rear seat of an automobile.

Another object of the invention is the construction of a novel and efficient deflector or anti-draft device which is adapted to be attached to the inside of the door of an automobile or motor vehicle, and which device will prevent a draft occurring over the shoulder of the operator, as well as protect any one in the rear of him.

It has been noted that a draft or wind always blows over the driver's shoulder, even if the wind wing is out; the wind wing partly deflects the air, but the air will curve back against the frame of the motor vehicle and thence will enter the motor vehicle over the driver's shoulder, unless a device like mine is used.

With the foregoing and other objects in view, my invention comprises certain novel constructions, combinations, and arrangements of parts as will be hereinafter fully described, illustrated in the accompanying drawings, and more particularly pointed out in the appended claims.

In the drawings:

Figure 1 is a horizontal, fragmentary, sectional view of a portion of a motor vehicle, showing in horizontal section my improved device in an applied position.

Figure 2 is a view in elevation of my device shown applied to the door of a motor vehicle.

Figure 3 is a vertical sectional view taken on line 3—3, Figure 2, and looking in the direction of the arrows.

Figure 4 is a sectional view taken on line 4—4, Figure 2, and looking in the direction of the arrows.

Figure 5 is a perspective view of the device.

Referring to the drawings, in which I have shown the preferred embodiment of my invention, I designates the body of a motor vehicle, and 2 is a door thereof. The door 2 is provided with the usual window 3 and wind wing 4.

The anti-draft device comprises a substantial semi-cylindrical body 5 which is provided with an attaching flange 6 throughout one edge thereof. The flange 6 is secured against the inner face of the door 2, by suitable fastening means 6c, as clearly shown in Figures 1 and 2; therefore, the body 5 is on the door 2 opposite to the conventional handle 6b on said door. The body 5 is closed at its bottom 7 and at its top 8; the top and bottom 8 and 7 are pitched as shown in Fig. 3, for adapting the device to any type of car. The body 5 is provided with a deflector plate 9 which acts as a baffle to prevent down drafts.

The outer vertical portion of the semi-cylindrical body 5 is inwardly curved at 10 on its outer edge to better hold the wind, and turn it out of the open car window 3.

The top 8 and the bottom 7 have two-part outer edges 8a and 7a (Fig. 5). The two-part edge 8a comprises inner portion 8b and outer portion 8c. The two-part edge 7a comprises inner portion 7b and outer portion 7c. The two parts of each edge are formed at an angle to each other. The two inner portions 8b and 7b are in alignment with the inner face of flange 6 to permit the device to bear snugly against the inner face of the door 2, as clearly shown in Figs. 1 and 4. Therefore, the device, including portions 8c and 7c, projects at an angle from door 2, overhanging part of the window 3 (Figures 1 and 4).

The device can be made of any material, such as Plexiglas, or the body made of one material and the top and bottom of another material. If the body is made of Plexiglas and the top and bottom of metal, the device will be transparent so that a person or persons in the rear seat of the motor vehicle can see through it.

I have found from actual experience with a device constructed in accordance with this invention that it eliminates drafts in a motor vehicle, and in all ways is highly efficient.

The device is attached to the door of the automobile by any suitable means placed in apertures 6a of the attaching flange 6.

While I have described the preferred embodiment of my invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. As a new article of manufacture, an anti-draft device comprising a semi-cylindrical body, said semi-cylindrical body being adapted to be mounted vertically adjacent the rear edge and on the inner side of a window opening in a vehicle door, said semi-cylindrical body provided with an integral top and an integral bottom, said body provided with an inner door-engaging edge and an outer longitudinally extending edge, said outer longitudinally extending edge being inwardly turned and overhangs a part of said window, said top and bottom each provided with an outer angular edge including an inner door-engaging portion and an outer portion, an integral attaching flange extending outwardly from the inner longitudinally extending door-engaging edge of said semi-cylindrical body, said attaching flange in alignment with the inner door-engaging portions of said angular edges of said top and bottom, and being adapted to be secured to the rear edge of said window opening, and the outer portions of said angular edges extending inwardly at an angle from said inner door-engaging portions.

2. As a new article of manufacture, an anti-draft device comprising a semi-cylindrical body, said semi-cylindrical body being adapted to be mounted vertically adjacent the rear edge and on the inner side of a window opening in a vehicle door, said semi-cylindrical body provided with an integral inclined top and an integral inclined bottom, said semi-cylindrical body provided with an inner door-engaging edge and an outer longitudinally extending edge, an integral deflector plate secured at its inner edge to the middle of said semi-cylindrical body, said top and bottom and deflector plate each being provided on its outer edge with an inner door-engaging portion and an outer portion at an angle to said door-engaging portion, said semi-cylindrical body being provided on its outer longitudinally extending edge with an inwardly curved portion overhanging a part of said window, whereby air is directed outwardly from said body, an integral flat attaching flange extending outwardly from the inner longitudinally extending door-engaging edge of said body, said attaching flange in vertical alignment with the inner portion of each outer edge of said top, bottom and deflector plate, and said attaching flange being provided with apertures.

OTTO ELSEBUSCH.

REFERENCES CITED

The following references are of record in the file of this patent:

UNITED STATES PATENTS

| Number | Name | Date |
|---|---|---|
| 1,613,044 | Marshall | Jan. 4, 1927 |
| 1,849,176 | De Dries | Mar. 15, 1932 |
| 1,968,948 | Lang | Aug. 7, 1934 |

FOREIGN PATENTS

| Number | Country | Date |
|---|---|---|
| 24,665 | Great Britain | 1904 |